US005409369A

United States Patent [19]

Win

[11] Patent Number: 5,409,369

[45] Date of Patent: Apr. 25, 1995

[54] APPARATUS FOR MAKING A WIDE ANGLE LIGHT DIFFUSING LENS

[75] Inventor: Murray M. Win, Beverly Hills, Calif.

[73] Assignee: Malcolite Corporation, Los Angeles, Calif.

[21] Appl. No.: 863,068

[22] Filed: Apr. 3, 1992

Related U.S. Application Data

[63] Continuation-in-part of Ser. No. 775,576, Oct. 15, 1991, Pat. No. 5,228,773.

[51] Int. Cl.[6] ........................ B29C 51/18; B29C 51/42

[52] U.S. Cl. .................................... 425/384; 425/403; 425/808

[58] Field of Search ................. 264/1.9, 2.7, 291, 292, 264/319, 320, 322; 425/403, 470, 808, 384

[56] References Cited

U.S. PATENT DOCUMENTS

| | | | |
|---|---|---|---|
| 2,022,639 | 11/1935 | Stimson | 264/319 |
| 2,586,778 | 2/1952 | Borchard | 264/322 |
| 2,937,403 | 5/1960 | Keith | 264/292 |
| 3,042,562 | 7/1962 | Peterson | 264/320 |
| 3,069,721 | 12/1962 | Arni et al. | 425/403 |
| 3,363,875 | 1/1968 | Hedgewick et al. | 425/808 |
| 3,417,959 | 12/1968 | Schultz | 425/470 |
| 4,115,486 | 9/1978 | Cowman, Jr. et al. | 264/2.7 |

FOREIGN PATENT DOCUMENTS

| | | | |
|---|---|---|---|
| 2419009 | 11/1979 | France | 264/292 |
| 1164641 | 3/1964 | Germany | 264/292 |

*Primary Examiner*—Mathieu D. Vargot
*Attorney, Agent, or Firm*—Robert J. Schaap

[57] ABSTRACT

An apparatus and method for making a wide angle light diffusing lens of the type which includes a peripherally extending lip for supporting the lens in a downwardly opening light fixture. The lens includes a downwardly and inwardly converging light translucent side walls as well as downwardly and inwardly extending end walls and which are connected together. These walls effectively form a prismatically shaped lens which permits dispersion of light from planes at a wide angle. The apparatus of the invention includes a form or mold having an upwardly extending rib on its upper surface which generally defines a lower edge of the lens and aids in defining the other edges of the prismatically shaped lens. A plastic sheet as, for example, an acrylic plastic sheet, is heated to a temperature where it softens and is somewhat flowable, moldable and bendable and which is then draped over the rib on the mold. A mold top is then disposed over the mold encapsulating the plastic sheet therein. When the sheet is cooled, it will assume the form of the wide angle light diffusing lens.

13 Claims, 6 Drawing Sheets

APPARATUS FOR MAKING A WIDE ANGLE LIGHT DIFFUSING LENS

RELATED APPLICATION

This application is a continuation-in-part of my U.S. patent application Ser. No. 775,576, filed Oct. 15, 1991, now U.S. Pat. No. 5,223,773, entitled "Wide Angle Light Diffusing Lens."

BACKGROUND OF THE INVENTION

1. Field of the Invention

This invention relates in general to certain new and useful improvements in an apparatus and the method for making an improved wide angle light diffusing lens and more particularly, to an apparatus and method of the type stated which permits a molding of the lens in a unique manner to produce wide angled light dispersion with the resultant lens.

2. Brief Description of the Prior Art

In the aforesaid co-pending application, there is described a unique and novel light diffusing lens of the type which is adapted for disposition across a downwardly facing opening of an overhead light. This light diffusing lens is a vast improvement over the conventional light diffusing lenses or so-called "defusers" and which prior art lenses each generally comprises a relatively rigid flat sheet of a plastic, material such as an acrylic plastic. These lenses usually have dimpled or prismatic elements on the surfaces of the lens. Nevertheless, because these prior art lenses are relatively flat sheets with light dispersal at an angle of 45 degrees from the edges, direct light distribution is relatively limited to areas beneath the lens.

Heretofore, it was assumed that in order to adequately light a work station or other area in which optimum lighting is desired, that all of the light from a fixture or at least a substantial portion of light from a fixture should be directed downwardly to that work station or other area where light is desired. In short, no effort was made to direct light to upper portions of side walls of a room or to a ceiling of a room. As a result, the only lighting on the upper portions of a room side wall or ceiling was a result of reflected light.

Most prior art light fixtures and the diffusing lenses used therewith were designed to provide light dispersal from the edges of the lens at an angle of about 45 degrees. Thus, the two opposite sides of a lens, actually provided light dispersion over a 90 degree angle on each of the sides of the lens. In some cases, the light dispersion did occur at about 65 degrees from planes at each of the vertical edges of the lens. However, in the prior art the maximum effective light dispersion was about 130 degrees. This also resulted in poorly lighted upper wall areas and ceilings of a room. One of the problems associated with the prior art lens was the harsh light condition. Inasmuch as the prior art lens was generally a relatively flat planar sheet, the sheet itself was very closely spaced from the actual light source, such as the fluorescent lamp or lamps. As a result, harsh light was generated. There were attempts to obviate this problem because of the resultant glare in glass surfaces, computer screens and the like, although these attempts to reduce the glare either reduced the amount of light or had other serious side disadvantages.

In the aforesaid co-pending patent application, there is described a lens which has a vertically positioned peripherally extending wall. Extending inwardly and downwardly from two of the longitudinal edges of that generally vertically arranged wall are a pair of side walls. Moreover, downwardly and inwardly extending end walls connect to the side walls and all meet at a joined line forming a lowermost edge of the lens. In accordance with this construction, light was defused from the vertically positioned peripheral wall as well as the inwardly and downwardly converging side walls and the end walls. As a result, there was a very wide dispersion of light substantially across all portions of a room, including upper portions of the walls and the ceilings of the room.

In most prior art lighting systems, it was generally assumed, as aforesaid, that light should be directed downwardly with little or no attempt to light upper portions of a room. It has been found in connection with the light diffusing lens in the co-pending patent application that personnel using a particular room believed that there was more light available at a given work station, when all portions of the room were well lighted with substantially equal light distribution across all portions of that room, when there was no given increase in light output compared to a conventional prior art lenses. In other words, the well-lighted effect of all portions of the room led the users or occupants of the room to believe that lighting output had been increased. Further, as a result of the fully lighted room, the lens of the aforementioned co-pending patent application provided an improved psychological effect on the occupants of the room where there is an even and substantially wide light distribution.

One of the main problems encountered with the aforesaid light diffusing lens was the need for a suitable apparatus and method to produce this lens. In achieving the wide angled light distribution, it was found that by distorting the effect of the prisms and the aligned rows of prisms on the surface of the lens, that an irregular but more highly diffused light pattern was achieved. It was therefore necessary to find a way to obtain this irregular surface effect without completely distorting an original sheet of plastic and maintaining properties necessary for durability of the plastic and without overheating or burning the plastic sheet during forming thereof.

The prior art lens producing techniques did not lend themselves to production of a light diffusing lens of the type required. Generally, all prior art apparatus and method for producing relatively flat sheet lenses relied upon a simple extrusion process. Even if any molding was involved, the molding operation was simple and was adapted to generally produce a flat sheet of an acrylic plastic. If the plastic sheet was provided with a dimpled surface, or otherwise a prismatic surface, the process was such that the dimples or prisms were all of a regular shape and in regular rows and columns and at least formed in a regular pattern on the surface of the sheet. Consequently, prior art techniques for producing a lens were not acceptable for use in producing the wide angle light diffusing lens of the type taught in the aforesaid co-pending patent application.

OBJECTS OF THE INVENTION

It is, therefore, one of the primary objects of the present invention to provide an apparatus for making a light diffusing lens having an irregular surface pattern to enable an irregular and wide dispersal of light passing therethrough.

It is another of the present invention to provide an apparatus of the type stated which is capable of producing a light diffusing lens in which light distribution of light passing through the lens will be substantially uniform throughout all portions of the lens and thereby produce a uniformly lighted area.

It is a further object of the present invention to provide an apparatus of the type stated which will deform a plastic sheet into a desired shape of a light diffusing lens and to still provide the necessary structural and integrity and strength for use as a light diffusing lens.

It is an additional object of the present invention to provide an apparatus of the type stated which can produce a uniquely shaped and designed light diffusing lens using standard state of the art plastic sheets and plastic compositions therefor.

It is also an object of the present invention to provide a method of making a light diffusing lens of the type stated with an irregular surface pattern on a surface of the lens and without compromising or otherwise affecting the structural integrity of the lens.

It is still another salient object of the present invention to provide a method for producing a light diffusing lens which is relatively economical to perform and which can also be performed on an automated basis and with little human intervention.

With the above and other objects in view, my invention resides in the novel features of form, construction, arrangement and combination of parts presently described and pointed out in the claims.

BRIEF SUMMARY OF THE DISCLOSURE

The present invention relates in general terms to both an apparatus and a method of producing a light diffusing lens having a unique shape with an irregular surface pattern thereon, as hereinafter described in more detail. This apparatus and method, in broad terms, relies upon precise heating and cooling of a plastic sheet, and preferably a light translucent plastic sheet, during a molding or forming operation.

In order to more fully appreciate the apparatus and method of the present invention, it is necessary to have a brief understanding of the overall shape and surface configuration of the light diffusing lens which is being produced thereby. This light diffusing lens is generally designed for disposition across the downwardly facing light dispensing opening of a ceiling mounted light fixture. However, the invention which is highly effective for producing lenses of this type, is not so limited and can be used for producing a variety of different types of light diffusing lenses.

The light diffusing lens which is produced in accordance with the apparatus and method of this invention is capable of providing a wide distribution and essentially substantial equal light distribution across all portions of a room or other environment including upper portions of the walls and the ceiling. As indicated above, it has been found that this distribution has a far better psychological effect on the occupants of that room or other area. Tests utilizing the light producing lens produced by the apparatus and method of this invention reveal that the personnel or occupants of a room believe that there is a substantially greater light distribution across all portions of that room even when there is no increase in light output and this leads to an improved psychological effect of the occupants of the room.

The light diffusing lens which is produced by the apparatus and method of the invention comprises a supporting lip which is peripherally extending for supporting the lens at the downwardly facing opening of the light fixture. A peripherally extending and preferably a rectangularly shaped vertical wall extends downwardly from the supporting lip. A pair of inwardly inclined second light translucent walls are connected to lower longitudinal edges of the first or vertically arranged light translucent wall. These side walls are connected at the lower margins to form a single lower edge. A pair of third walls or end walls extend across the opened transverse regions formed by the diverging side walls and are also connected at the their lower ends to this lower edge of the light diffusing lens. These end walls are also downwardly and inwardly inclined.

The light diffusing lens produced by the apparatus and method of the invention has been found to produce light distribution at an angle substantially in excess of 180 degrees. Indeed, if this lens were supported in space, it would provide an almost circular or 360 degree light distribution pattern.

In order to produce the light diffusing lens of the invention, a suitable light translucent plastic sheet, such as an acrylic sheet, is heated to a temperature where the plastic becomes slightly molten, that is, where it does not assume a liquid form but yet becomes bendable and formable. Initially, the sheet such as an acrylic sheet, at room temperature, is a rigid and somewhat brittle plastic sheet. The sheet used for producing the light diffusing lens of the invention has prisms, and usually four-sided prisms, on a face thereof. When the sheet is normally produced, the prisms are located adjacent to one another in regular rows thereof. In other words, there are rows or columns of prisms and all prisms in a row or column are precisely oriented and abutted next to one another.

After the heating of the plastic sheet to a point where it becomes formable or bendable, the sheet is then draped across a mold. In a preferred embodiment of the invention, the mold may be formed of a wooden frame having a plurality of upwardly projecting ribs. These ribs, in combination with the frame, define the outer appearance and shape of the lens which is produced thereby. A lid is then placed over the mold and cooling air is introduced through cooling vents in the lid or the mold to enable the cooling of the plastic sheet to the desired shape. When the sheet has been cooled, it will become a rigid member with sufficient structural integrity to withstand use as a light diffusing lens.

During the forming of the light diffusing lens of the invention, the plastic sheet is heated and stretched in certain portions and compressed in other portions. This results in an irregular surface pattern of the prisms on the face of the plastic sheet which is initially formed. As indicated previously, the prisms existed in essentially straight rows or columns on the surface of the sheet. After formation of the light diffusing lens, and in certain selected areas, the prisms are actually located in arcuately shaped rows of prisms. Moreover, the arcuately shaped rows are not necessarily formed of uniform arcs. In addition, many of the prisms have become distorted in shape and surface configuration. Many of the prisms were previously regular or somewhat pyramidal in shape on the initial plastic sheet and after formation of the light diffusing lens, the pyramids no longer assume a type of diamond shape but are now somewhat trapezoidal in shape.

During the formation of the light diffusing lens produced by this apparatus and method, the stresses which were initially present in the plastic sheet are released during the heating operation. Inasmuch as the sheet is allowed to cool slowly by ambient or slightly cooler than ambient air, the stresses which were previously introduced in the sheet are no longer reintroduced. Thus, the sheet is less brittle than the previous plastic sheet which served as a prior art light diffusing lens. Moreover, the lens has substantial structural integrity and can withstand abuse which the prior art light diffusing flat sheet lenses are not capable of withstanding.

The apparatus and method of the invention are also effective in producing a lens which can be considered a sculptured lens. Not only are the various prisms on the surface thereof altered in shape, but many of the prisms differ from other prisms and the rows and columns are also altered. Since the walls are located at angles relative to one another, they are not merely a flat plastic sheet which is the case in substantially all prior art light diffusing lenses.

This invention has many other purposes and has other advantages which will be made more fully apparent from a consideration of the forms in which it may be embodied. One of these forms of the apparatus and the resultant method is described in the following detailed description of the invention and is illustrated in the drawings which accompany this present specification. However, it should be understood that this detailed description and the drawings are only set forth for purposes of illustrating the general principles of the invention and are not to be taken in a limiting sense.

BRIEF DESCRIPTION OF THE DRAWINGS

Figure 1:
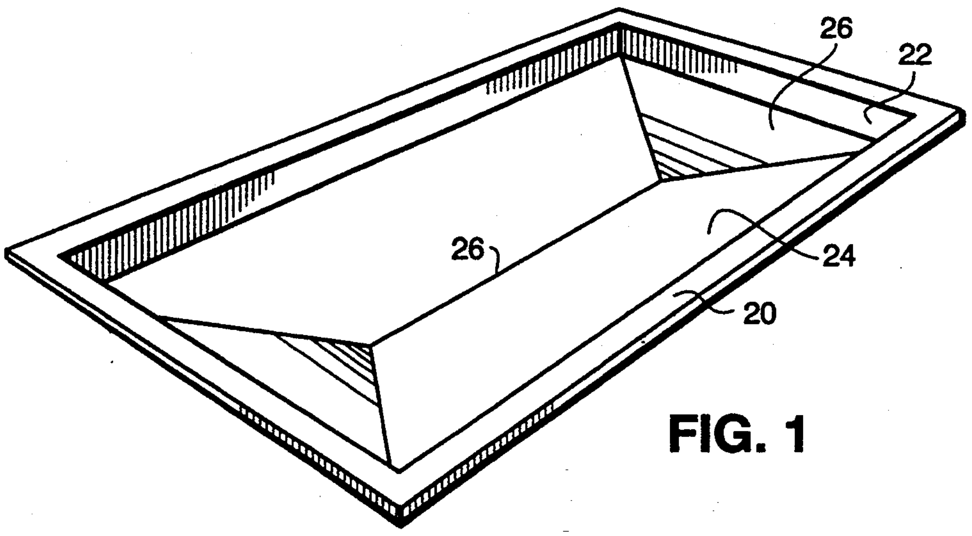
Figure 2:
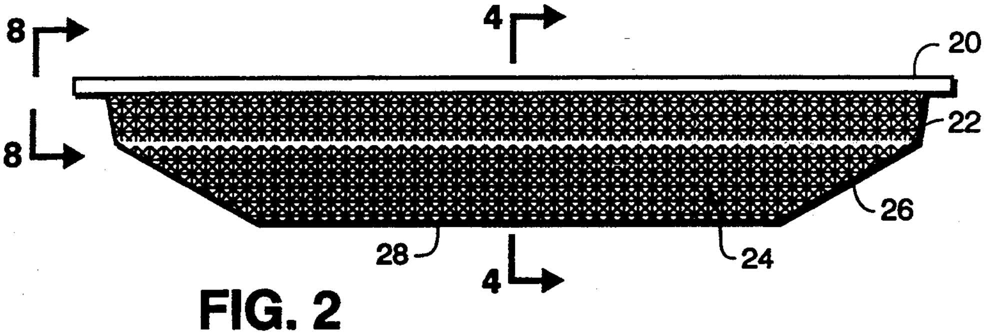
Figure 3:
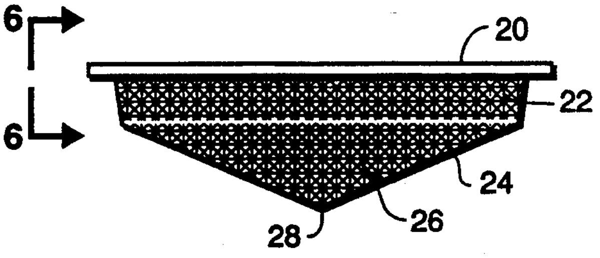
Figure 4:
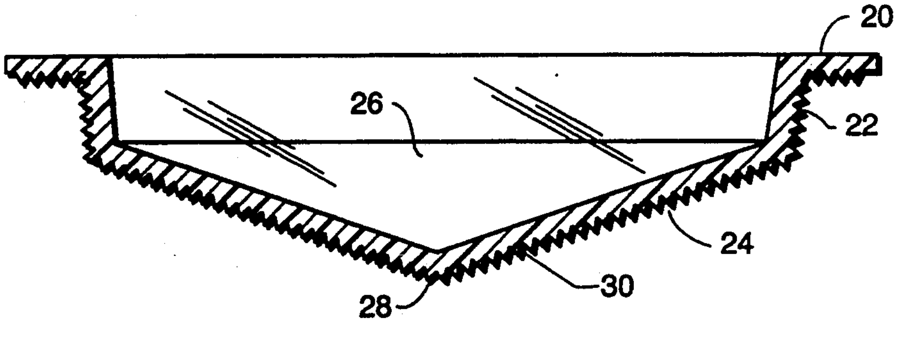
Figure 5:
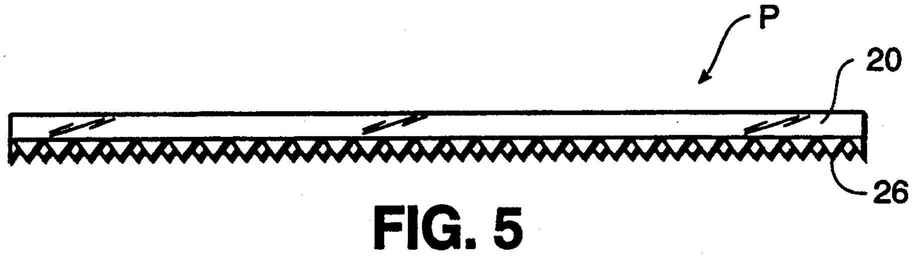
Figure 6:
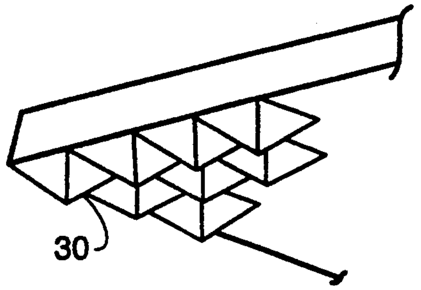
Figure 7:
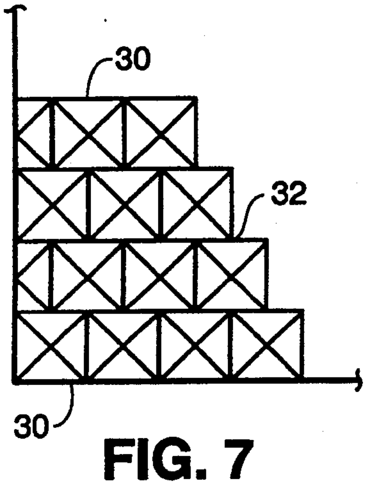
Figure 8:
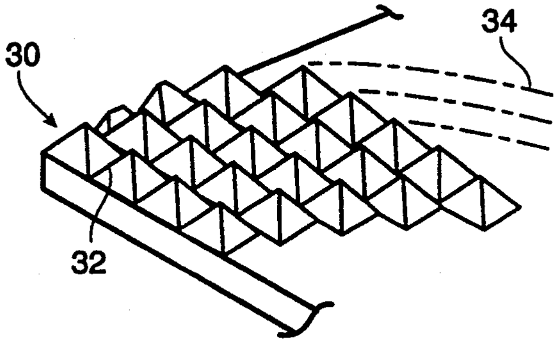
Figure 9:
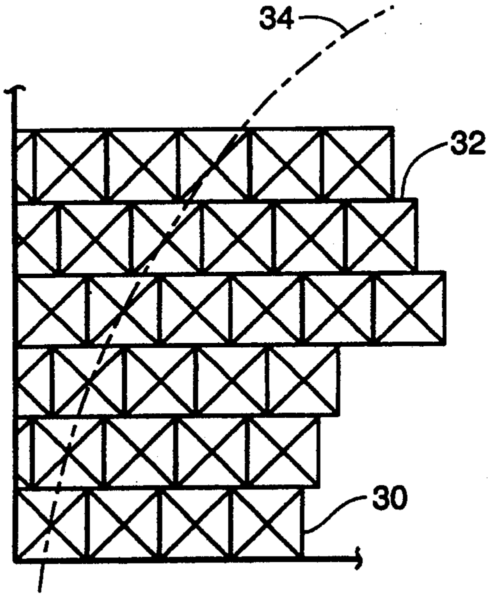
Figure 10:
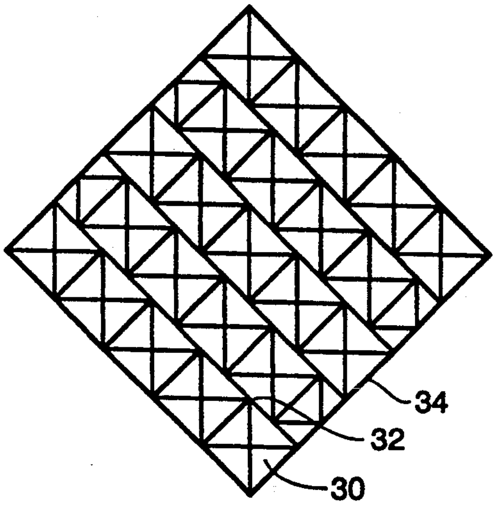
Figure 11:
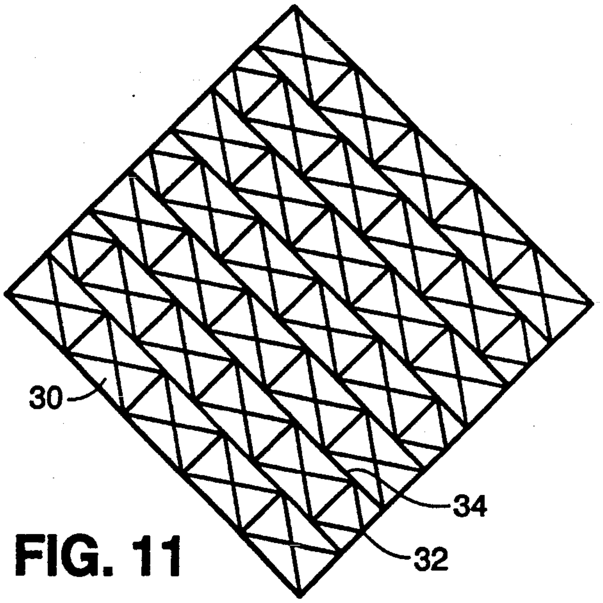
Figure 12:
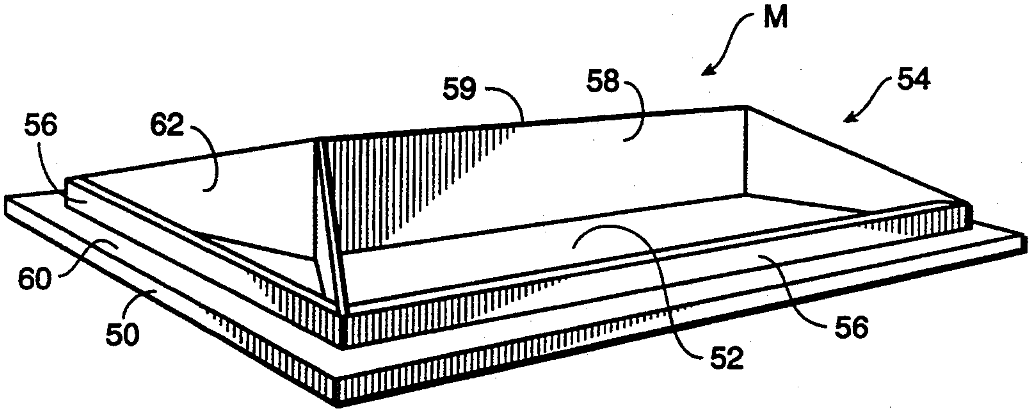
Figure 13:
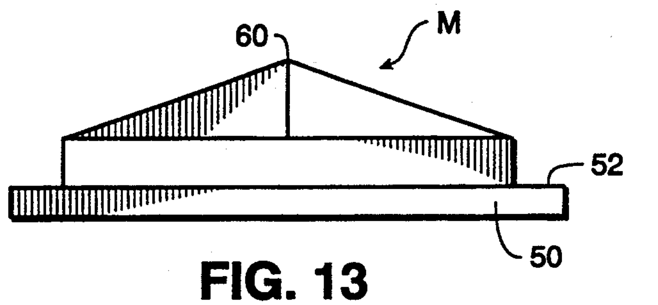
Figure 14:
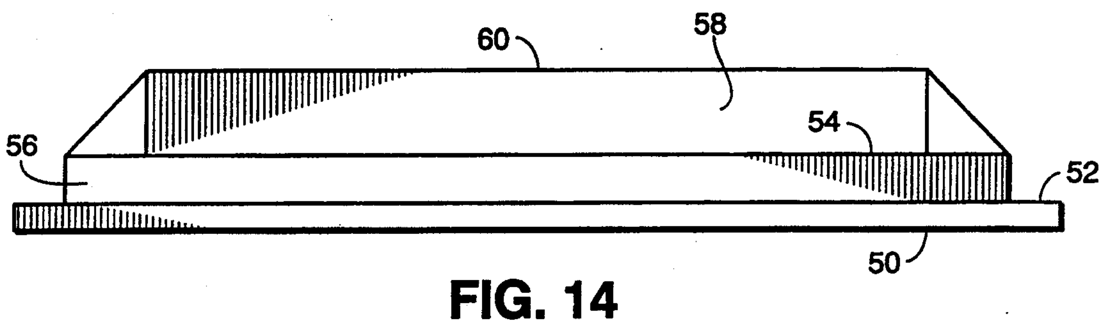
Figure 18:
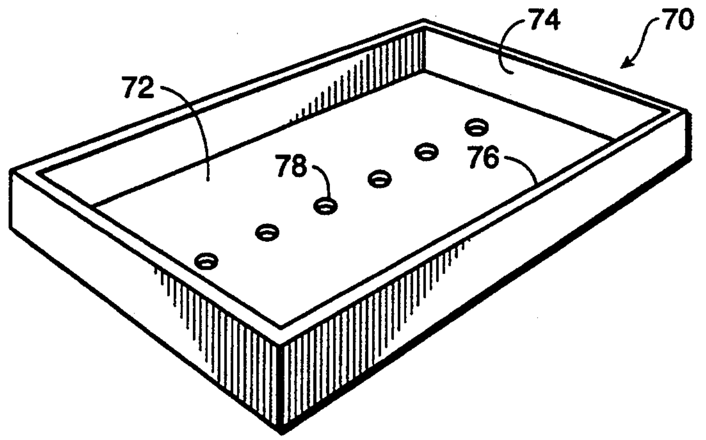
Figure 15:
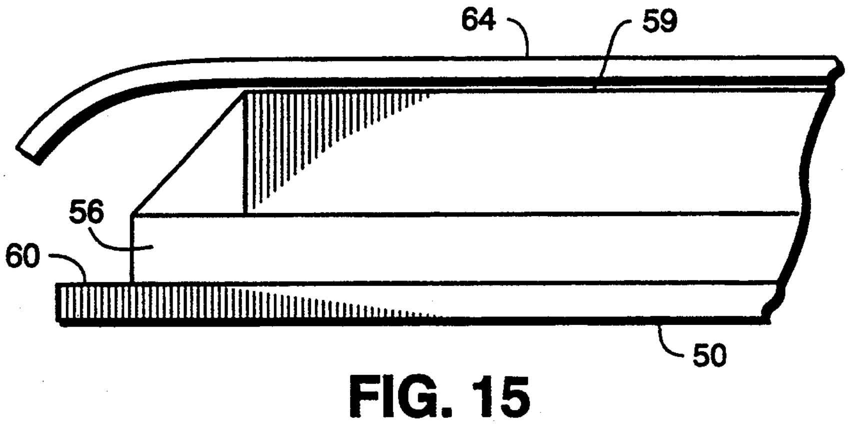
Figure 16:
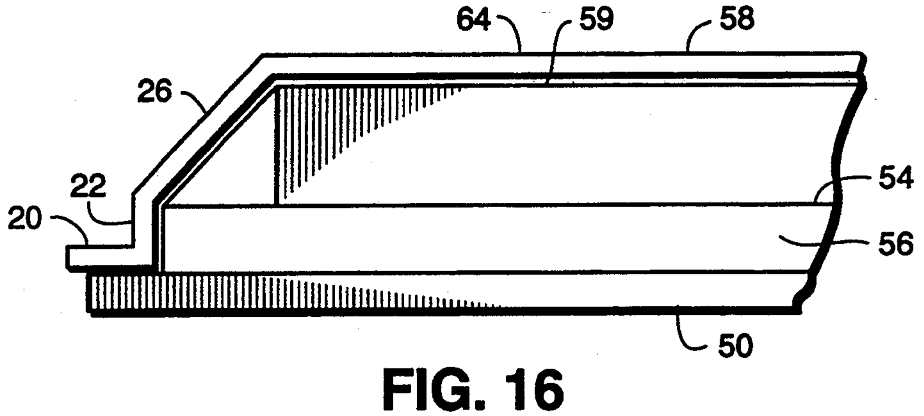
Figure 17:
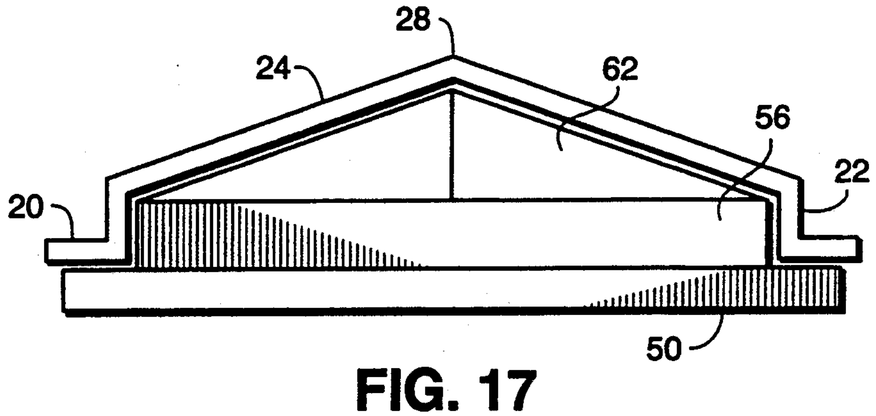

Having thus described the invention in general terms, reference will now be made to the accompanying drawings (three sheets) in which:

FIG. 1 is a perspective view of one form of light diffusing lens which is produced in accordance with the apparatus and method of the present invention;

FIG. 2 is a side elevational view of the light diffusing lens of FIG. 1 which is produced in accordance with the apparatus and method of the present invention;

FIG. 3 is an end elevational view of the light diffusing lens of FIG. 1 which is produced in accordance with the apparatus and method of the present invention;

FIG. 4 is a vertical sectional view of the light diffusing lens produced by the apparatus and method of the invention and is taken substantially along line 4—4 of FIG. 1;

FIG. 5 is an a side elevational view of the flat sheet initially used to form the light diffusing lens of the present invention showing rows of prisms on the flat sheet;

FIG. 6 is a fragmentary perspective view illustrating the regular array of the prisms on a downwardly facing surface of the flat sheet used to produce the light diffusing lens in accordance with the present invention;

FIG. 7 is a bottom plan view of the array of prisms in the flat sheet of FIG. 6;

FIG. 8 is a fragmentary perspective view of the array of prisms on a portion of the surface of the light diffusing lens (in an inverted position for purposes of clarity) produced in accordance with the present invention after formation of the initially flat plastic sheet into the lens;

FIG. 9 is a fragmentary bottom plan view showing an array of a portion of the prisms on the light diffusing lens which is illustrated in of FIG. 8;

FIG. 10 is a bottom plan view showing the array of prisms on a flat plastic sheet used in the production of the light diffusing lens achieved by the apparatus and method of the invention;

FIG. 11 is a bottom plan view of a portion of the light diffusing lens and showing the array of a portion of the prisms on a lens which is achieved in accordance with the apparatus and method of the present invention;

FIG. 12 is a perspective view of one form of mold which may be used to produce the light diffusing lens in accordance with the apparatus and method of the invention;

FIG. 13 is an end elevational view of the mold of FIG. 11;

FIG. 14 is a side elevational view of the mold of FIG. 11;

FIG. 15 is a fragmentary side elevational view showing a heated plastic sheet initially draped over the mold of FIGS. 12–14;

FIG. 16 is a fragmentary side elevational view showing a heated plastic sheet draped over and completely conforming to the mold of FIGS. 12–14;

FIG. 17 is a side view showing a heated plastic sheet conforming to the mold of FIGS. 12–14;

FIG. 18 is a perspective view of a lid which is used in connection with the mold of the present invention.

Figure 19:
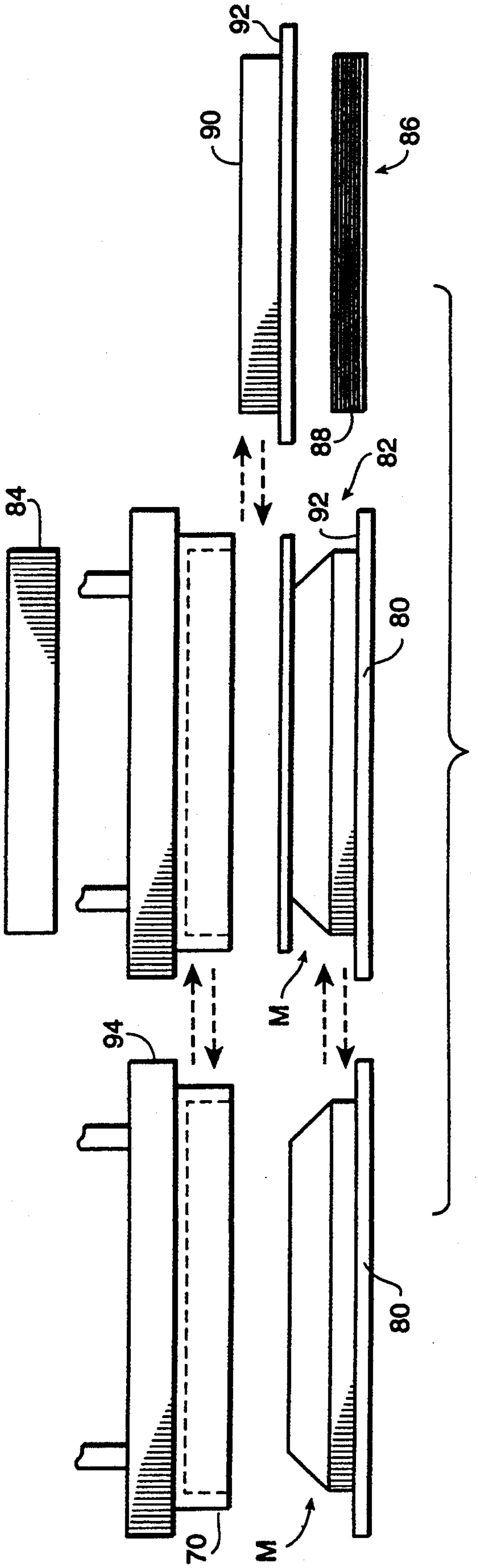

FIG. 19 is an end elevational view showing an apparatus and a method for producing the light diffusing lenses on a mass production basis.

DETAILED DESCRIPTION OF A PREFERRED EMBODIMENT

Referring now in more detail and by reference characters to the drawings which illustrate a preferred embodiment of the present invention, L designates a light diffusing lens which may be produced by and in accordance with the apparatus and method of this invention. In order to more fully appreciate and understand the apparatus and method of the invention, a brief description of the lens L is set forth.

The lens L which is to be produced by the present apparatus and method is comprised of a peripherally extending supporting rim 20 and which is, in turn, integrally formed with a generally vertically arranged light translucent wall 22 in the manner as best illustrated in FIGS. 1–4 of the drawings. The light translucent wall 22 is also provided with a pair of downwardly and inwardly inclined side walls 24 and which extend inwardly at an angle of about 5 degrees to about 75 degrees and which can vary between about 10 degrees to about 35 degrees and preferably about 65 degrees.

Connected across the open ends formed by the downwardly and inwardly converging side walls 24 are a pair of downwardly and inwardly converging end walls 26. Furthermore, it can be observed that the side walls 24 form a lowermost edge 28 of the lens. The end walls 26, which are generally triangularly shaped are connected to the ends of that lowermost edge 28 in the manner as best illustrated in FIGS. 1 and 4 of the drawings.

It may be observed that the each of the walls of the lens are light translucent and may, for that matter, be transparent, if desired. However, a light translucent lens is preferred in order to better obtain light diffusion. Furthermore, the outer surface of each of the walls of the lens, including the generally vertically disposed wall 22, the side walls 24 and the end walls 26 have irregular outer surface patterns. In a preferred embodiment, the surface patterns are actually prismatic outer surfaces.

In forming the lens L of the present invention, a flat plastic sheet is used as the starting material, as hereinafter described in more detail. Further, in order to understand the lens L of the present invention, slight reference must also be made to the formation of this lens starting with and from this initially presented plastic sheet. The plastic sheet which is used to form the lens L of the invention has a regular surface pattern of prisms as best illustrated in FIGS. 5–7 and 10 of the drawings. In this case, it can be observed that four-sided prisms are formed on the underside of the plastic sheet so that such prisms exist on the outwardly presented surface of each of the walls of the lens. The prisms 30 are initially arranged in linear rows, as best illustrated in FIGS. 6 and 7 of the drawings. In addition, each of the prisms 30 extend in linear row 34 and each of the rows are separated by linear troughs 32.

By reference to FIG. 10, it can also be observed that each of the prisms 30 are regularly shaped, that is, they have a square base in top plan view, as best illustrated in FIG. 10 of the drawings. When formed into the lens L, many of these prisms and the rows thereof will become distorted in shape, as hereinafter described in more detail.

The materials used in the formation of the lens are essentially those materials used in the formation of the flat sheet which is molded into the lens of the present invention. In other words, these materials used in the formation of the light diffusing lens L are the same materials used in the formation of the flat sheet P as aforesaid. In a preferred embodiment, the acrylic resins, such as methyl acrylate and methacrylate are widely used. Further, co-polymers of the acrylates are often employed. Nevertheless, essentially and light translucent material which is capable of diffusing light when passing therethrough and which has the necessary structural integrity may be used in the formation of the lens L.

It can be observed that after formation of the lens L in accordance with the present invention, the pyramid-shaped projections 30 or prisms on the outwardly presented surface of the lens L form somewhat arcuately shaped columns 34 over their length. Thus, by reference to FIGS. 8 and 9, it can be observed that the troughs or grooves 32 between each of the projections 30 are linear as in the case of the initial starting sheet. Although the reason is not fully understood, it is believed that in the formation process, due to uneven bending, the rows of plastic prisms assume a shape somewhat similar to that illustrated in FIGS. 8 and 9. Nevertheless, this has been found to be quite beneficial in that it literally creates a better distribution of light by using an irregular prism pattern, as opposed to the regular prism patter in the initial sheet of plastic.

The rows of prisms 65 only have a slight arcuate shape, as best illustrated by reference to FIGS. 8 and 9. Moreover, while the arcuate rows have been illustrated as having a regular arcuate shape, the shape could be slightly irregular. Moreover, the radius of curvature in the various rows could also vary somewhat. In essence, it has been found that while portions of the sheet do assume arcuately-shaped rows of prisms, other portions of the sheet may still have linear rows of prisms. The radius of curvature of the rows of prisms will probably vary depending upon the amount of heating and the degree of bending which takes place in an initially flat sheet to form the lens L.

Referring now to FIGS. 10 and 11, which illustrate prism sections on the exterior surface of the lens, it can be observed that in some portions of the lens, the prisms have a regular shape as illustrated in FIG. 10. In other words, the prisms have a somewhat diamond-shaped appearance in top-plan view and all sides thereof are equilateral and equiangular. However, in some portions of the lens L, the prisms are actually stretched, as best illustrated in FIG. 11. In this case, the prisms assume somewhat of an orthagonal and particularly a trapezoidal shape with longer lengths than widths. Here again, it is believed that this shape results from the heating and bending of the initially flat sheet to form the lens L.

The lens L produced by the apparatus and method of the present invention is highly effective in that the occupants of a given environment, such as a room in which the lens is used, actually believe that there is a greater degree of light output. The occupants of this room believe that the lens L produces a greater light output then a conventional flat sheet prior art lens, notwithstanding the fact that the same lumen output may be employed. This is due to the fact that the prismatic outer shape of the lens itself creates a very wide degree of light dispersion. In fact, if the lens were suspended in a room, it would provide almost a 360 degree light output. Nevertheless, the occupants of a lighted area using the lens which is produced by the apparatus and method of the invention perceive of a complete surrounding and presence of light when all portions of the room are lighted rather than when only specific work areas are lighted.

The lens which may be produced dramatically inhibits glare and reduces the effect of shadows. Further, there is softer light at work stations and the like. There has even been a perceived, if not noticeable, reduction in sound level when using this lens.

As indicated previously, there is no commercially available effective techniques prior to this invention for producing this lens L. FIGS. 12–14 illustrate a preferred form of mold M which may be used for producing the lens L. In this case, the mold M comprises a base plate 50 having a flat upper surface 52. Extending upwardly from the flat surface is a mold frame 54 having an outer peripherally extending generally vertically disposed wall 56. Also extending upwardly from the base plate is a longitudinally extending centrally located upstanding rib 58 having an upwardly presented edge 59 as best illustrated in FIGS. 12–14 of the drawings. By further reference to FIGS. 12–14, it can be observed that the rib 58 is centrally located midway between the longitudinal walls 56 of the rim 54.

The peripherally extending vertically disposed wall 56 is spaced inwardly from the peripheral edge of the base plate 50 and thereby forms a horizontal sheet receiving surface 60, as best illustrated in FIG. 12 of the drawings. Projecting outwardly from the ends of the rib 58 at approximately 45 degree angles are a pair of outwardly extending somewhat triangularly shaped flanges 62 which intersect the angle between longitudinal sections of the walls 56 and transverse sections of the wall 56.

It can be observed that the mold as illustrated is relatively inexpensive and can be manufactured from low-cost wood components. Thus, an in this case, expensive molds are not required. In fact, the mold of the invention can be constructed in a woodworking shop. Nevertheless, for mass production of the lenses L, an automated facility with molds stamped or cast from metal, such as steel, are preferred, as hereinafter described.

In order to form the lens L, an initial sheet of plastic 64 is heated to a temperature where it is slightly molten so as to be formable and bendable. However, the plastic itself is not necessarily fluid so as to possess material flow characteristics. Rather, the plastic sheet is only heated to a point where it is soft and pliable and easily conforms to a surface upon which it may be draped.

After the sheet 64 has been heated sufficiently, it is then draped over the mold as best illustrated in FIGS. 15–17 of the drawings. In this case, it can be observed that the upper edge 59 of the central rib 58 will cause the formation of the lower-most edge 28 of the lens L. The sheet draping over the rib 58 is pulled somewhat taut so that the sheet actually bears against and is partially bent about the upper edge of the vertical wall 56.

The positioning of the plastic sheet against the wall 56 will form the first generally vertically and partially angulating same over the upper edge of the wall 56 will form the first generally vertically arranged light translucent wall 22. In addition, the sheet 64, when pulled taut, will cause the formation of the side walls 24 of the lens L between the rib 58 and the upper edge of the longitudinal side wall sections 56 of the mold M. Also, when the sheet is pulled taut, the flanges 62, in combination with the transverse side walls 56 of the mold M will cause formation of the end walls 26 of the lens L. Finally, the remaining portion of the sheet 64 disposed on the upper surface 60 of the base 50 forming part of the mold M will cause formation of the peripheral supporting rim 20 of the lens L.

The sheet is allowed to harden on the mold M so that when it is fully cured, it will adopt the shape of the lens L as shown in FIGS. 1–4 of the drawings.

FIG. 18 illustrates a lid 70 which may be disposed over the mold in order to maintain the sheet 64 in a taut position on the mold and force the periphery into contact with the surface 60. In this case, the lid 70 is provided with flat top wall 72 having a peripherally extending rim 74 with a downwardly facing rim-forming edge 76. The interior surface of the wall 74 will abut against the sheet 64 and hold the same tightly against the exterior surface of the side wall 56. In so doing, it will also maintain a tautness on the sheet to aid in the formation of the side walls 24 and the end walls 26 as well as the generally vertically disposed peripheral wall 22 of the lens L. The rim-forming edge 76 will abut against the portion of the sheet disposed on the upper surface 60 of the base 50.

The lid 70 may also be provided with the cooling holes 78 in the upper surface thereof. These cooling holes 78 could be arranged to allow ambient air to pass into the interior surface thus formed when the lid is disposed on the mold. In addition, if desired, air could be driven into the cooling holes 78 in order to further aid in the cooling process.

It can be observed, that no special cooling is required in formation of the lens L. The only special equipment other than the mold and the lid which may be needed, is that of a suitable oven to heat the initially formed plastic sheet. Again, the heating may be accomplished by any conventional means as, for example, a conventional heating oven, or, for that matter, an infrared heater or the like. Further, since the mold M and the lid 70 may both be formed of wood, the apparatus, in accordance with the invention, is relatively inexpensive to produce but nevertheless, results in a highly effective lens. It can also be observed that very minimal manual intervention is required in the formation of the lens L. Moreover, it can also be observed that skilled labor is not required. It is only necessary to take the plastic sheet, after heating thereof, and drape the same across the mold and then dispose the lid over the mold. Beyond this, the sheet itself will cure and when fully cured, can be released from the mold.

Inasmuch as the sheet itself is not heated to any substantial temperature, mold release agents and the like are not required. Further, no special formulation of the sheet is required in order to produce the lens L of the present invention.

FIG. 19 illustrates an apparatus capable of producing the light diffusing lenses L on a mass production basis. In effect, FIG. 19 illustrates the major components forming part of this mass production apparatus in somewhat schematic form, since many of the details of construction are not necessarily relevant and might tend to obscure the invention.

In a broad sense, the apparatus of FIG. 19 comprises a platen 80 which supports the mold M, or a mold similar to the previously described mold M and which may be constructed of a suitable metal, such as steel or the like. The platen 80 is capable of being shifted to the right, reference being made to FIG. 19 from a loading station 81 where it is initially illustrated to a work station designated as 82. In this work station, the platen 80 and the mold M carried thereby will be located beneath a suitable heating mechanism 84 and which may be a bank of conductive heaters or infrared heaters, or the like.

Located to the right of the work station 82 is a sheet loading station 86 and which comprises a stack of flat plastic sheets 88 used in the formation of the lens L. A sheet transporting member 90 is also shiftable with respect to the work station 82 and the loading station 86 in the direction of the arrows. The sheet transporting member 90 may comprise fingers or other mechanisms for lifting a single sheet of plastic from the stack 88 and temporarily holding the same in an elevated position, as best illustrated in FIG. 9. The member 90 is then shifted to the left where it is capable of dropping as a rigid plastic sheet 92 onto the upper surface of the mold M. The sheet transporting member 90 is thereafter returned to its initial position at the loading station 86.

The sheet transporting member 90, in a preferred embodiment, adopts a member which has a flat bottom plate containing a plurality of vacuum holes. A vacuum is imposed on an interior chamber in the member 90 and this is sufficient to raise and temporarily hold the sheet 92 until it is moved to the position where it is disposed over the mold M. At that point, the vacuum is released and the sheet will automatically drop to the mold M.

When the sheet 92 is located over the mold M, the heating bank 84 is energized for heating the sheet to a somewhat molten state, as previously described.

Located above the platen 80, and being shiftable in essentially the same directions as the platen 80, is a lid transporting mechanism 94 for transporting the lid to the work station 82. This lid transporting mechanism is capable of engaging the lid 70 and moving the same to the work station 82 where it will place the lid 70 on the top of the plastic sheet which is heated and hence, the mold M capturing the sheet therebetween, in the manner as previously described. In this case, the lid 70 would only be moved to the work station after the plastic sheet 92 has been heated. Thereafter, when the sheet 92 is formed, the lid 70 is engaged by the lid transporting mechanism 94 and returned to its initial position 81, as illustrated in the left-hand side of FIG. 19. Any suitable mechanism for releasibly holding the lid 70 could be employed as, for example, actuable fingers or the like.

It should be understood that a loading station similar to the one in the left-hand side of FIG. 19 could also be employed on the right-hand side of FIG. 19. In this way, loading and unloading operations can take place almost simultaneously. Thus, while a sheet of plastic is dropped onto and molded at the work station 82, another lid transporting mechanism would be moving to the left and the platen 80 would similarly be moved to the left where the formed lens can be unloaded.

Thus, there has been illustrated and described a unique and novel apparatus and method for producing a light diffusing lens of the type which enables a wide distribution of light and which apparatus can be employed at a relatively low cost, but which is highly effective in achieving production of the lens. It should be understood that many changes, modification, variations and other uses and applications apparent to those skilled in the art, after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by letters patent is:

1. An apparatus for making a wide angled light dispersing light diffusing lens having projecting elements which project outwardly from a surface thereof, a vertically arranged light translucent wall, downwardly and inwardly inclined translucent side walls and downwardly and inwardly inclined translucent end walls, said apparatus comprising:

a) mold having a mold frame;

b) an upwardly extending longitudinal member on said mold frame to receive an initially rigid heated translucent plastic sheet having projecting elements which project outwardly from a surface thereof, said longitudinal member allowing longitudinally extending portions of the sheet to drape downwardly when disposed over the longitudinal member and heated sufficiently to become flexible thereby forming the downwardly and inwardly inclined side walls of the lens;

c) outwardly located upwardly extending end members on said mold frame projecting outwardly from said upwardly extending longitudinal member and allowing additional portions of the plastic sheet to drape downwardly thereby forming the downwardly and inclined end walls of the lens, said end members also cooperating with said longitudinal member to aid in the formation of said side walls;

d) vertical members on said mold frame to form the vertically arranged light translucent wall of the lens;

e) a cover disposable over said mold frame and retaining the plastic sheet on the horizontally disposed plate; and f) heating means associated with said mold for heating the initially rigid plastic sheet to temperatures where it becomes flexible and pliable and will flow sufficiently to conform to the shape of the mold such that unsupported sections of the sheet will drape, said sheet being of a material that will become rigid again when allowed to cool sufficiently and said mold being constructed to allow cooling of the sheet after molding thereof so that the sheet will effectively adopt the shape imparted to the sheet by the mold and where the projecting elements will still project outwardly from a surface thereof.

2. The apparatus for making a lens of claim 1 further characterized in that said lens also comprises a peripherally extending lip for support in a fixture and said frame also comprises a horizontally disposed plate which enables formation of a peripherally extending lip on said lens.

3. The apparatus for making a lens of claim 1 further characterized in that said upwardly extending longitudinal member is an elongate rib extending longitudinally of said mold frame.

4. The apparatus for making a lens of claim 1 further characterized in that said cover is provided with a cooling means to allow for cooling of the sheet after formation thereof into a lens.

5. The apparatus for making a lens of claim 1 further characterized in that said sheet used in the formation of said lens is provided with projecting elements which project outwardly from the surface thereof, said cover being disposed over said mold and which captures said sheet therebetween, said cover and mold also cooperating to cause a stretching and deformation of the sheet in certain areas so that the projecting elements are also deformed.

6. The apparatus for making a lens of claim 5 further characterized in that the projecting elements extend in linear aligned rows in said sheet and means is associated with said mold to cause the rows to become deformed to assume an arcuate contour in the formed lens.

7. The apparatus for making a lens of claim 6 further characterized in that said projecting elements on said sheet are pyramidal shaped elements and said cover and mold constitute means which cooperate to cause stretching and deformation of the projecting elements, along with the sheet in certain areas, so that the pyramidal shaped projecting elements also become deformed.

8. An apparatus for making a wide angled light dispersing light diffusing lens having projecting elements which project outwardly from a surface thereof, a vertically arranged light translucent or transparent wall, downwardly and inwardly inclined translucent or transparent side walls and downwardly and inwardly inclined translucent or transparent end walls, and a peripherally extending lip for support in a fixture said apparatus comprising:

a) mold having a mold frame;

b) an upwardly extending longitudinal member on said mold frame to receive a heated translucent or transparent plastic sheet allowing longitudinally extending portions of the sheet to drape downwardly thereby forming the downwardly and inwardly inclined side walls of the lens when disposed over the longitudinal member and heated sufficiently to become flexible;

c) outwardly located upwardly extending end members on said mold frame projecting outwardly from said upwardly extending longitudinal member and allowing additional portions of the plastic sheet to drape downwardly thereby forming the downwardly and inclined end walls of the lens, said end member also cooperating with said longitudinal member to aid in the formation of said side walls;

d) a horizontally disposed plate over said mold frame and which aids in the formation of the peripherally extending lip of the lens;

e) vertical members on said mold frame to form the vertically arranged light translucent wall of the lens when disposed over the longitudinal member and heated sufficiently to become flexible; and f) a cover disposable over said mold frame and retaining the plastic sheet on the horizontally disposed plate.

9. The apparatus for making a lens of claim 8 further characterized in that said upwardly extending longitudinal member is an elongate rib extending longitudinally of said mold frame.

10. The apparatus for making a lens of claim 8 further characterized in that said cover is provided with a cooling means to allow for cooling of the sheet after formation thereof into a lens.

11. An apparatus for making a wide angled light dispersing and light diffusing lens having projecting elements which project outwardly from a surface thereof, a vertically arranged light translucent wall, downwardly and inwardly inclined translucent side walls and downwardly and inwardly inclined translucent end walls, said apparatus comprising:

a) mold having a mold frame;

b) an upwardly extending longitudinal member on said mold frame to receive a heated translucent plastic sheet having projecting elements which project outwardly from a surface thereof, said longitudinal member allowing longitudinally extending portions of the sheet to drape downwardly when disposed over the longitudinal member and heated sufficiently to become flexible thereby forming the downwardly and inwardly inclined side walls of the lens;

c) outwardly located upwardly extending end members on said mold frame projecting outwardly from said upwardly extending longitudinal member and allowing additional portions of the plastic sheet to drape downwardly thereby forming the downwardly and inclined end walls of the lens, said end members also cooperating with said longitudinal member to aid in the formation of said side walls;

d) vertical members on said mold frame to form the vertically arranged light translucent Wall of the lens; and e) a cover disposable over said mold frame and capturing the plastic sheet between the frame and cover and causing a deformation of the sheet in certain areas so that the projecting elements are also deformed.

12. The apparatus for making a lens of claim 11 further characterized in that the projecting elements extend in linear aligned rows in said sheet and means is associated with the mold to cause the rows to become deformed to assume an arcuate contour in the formed lens.

13. The apparatus for making a lens of claim 12 further characterized in that said projecting elements on said sheet are pyramidal shaped elements and said cover and mold constitute means which cooperate to cause stretching and deformation of the projecting elements, along with the sheet in certain areas, so that the pyramidal shaped projecting elements also become deformed.

* * * * *